(12) United States Patent
Arazaki

(10) Patent No.: US 11,134,177 B2
(45) Date of Patent: Sep. 28, 2021

(54) PRINTING APPARATUS AND COLORIMETRY CONTROL METHOD OF PRINTING APPARATUS

(71) Applicant: SEIKO EPSON CORPORATION, Tokyo (JP)

(72) Inventor: Shinichi Arazaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 16/824,825

(22) Filed: Mar. 20, 2020

(65) Prior Publication Data

US 2020/0298586 A1 Sep. 24, 2020

(30) Foreign Application Priority Data

Mar. 22, 2019 (JP) .............................. JP2019-055495

(51) Int. Cl.
*H04N 1/60* (2006.01)
*H04N 1/00* (2006.01)

(52) U.S. Cl.
CPC ....... *H04N 1/6033* (2013.01); *H04N 1/00015* (2013.01); *H04N 1/00023* (2013.01); *H04N 1/00034* (2013.01); *H04N 1/00045* (2013.01); *H04N 1/00082* (2013.01); *H04N 1/00087* (2013.01); *H04N 1/6044* (2013.01)

(58) Field of Classification Search
CPC ........... H04N 1/00015; H04N 1/00023; H04N 1/00031; H04N 1/00034; H04N 1/00045; H04N 1/00082; H04N 1/00087; H04N 1/603; H04N 1/6033; H04N 1/6036; H04N 1/6038; H04N 1/6041; H04N 1/6044; H04N 1/605

See application file for complete search history.

(56) References Cited

U.S. PATENT DOCUMENTS 9,721,195 B2 * 8/2017 Nozawa .................. G01J 3/463
2011/0149316 A1 6/2011 Omagari et al.

FOREIGN PATENT DOCUMENTS

JP 2000-283852 10/2000
JP 2011-148298 8/2011

* cited by examiner

*Primary Examiner* — Scott A Rogers
(74) *Attorney, Agent, or Firm* — Workman Nydegger

(57) ABSTRACT

A printing apparatus includes a printing unit configured to move in a scanning direction, a color measuring unit configured to move in the scanning direction with the printing unit and perform colorimetry on patches, and a control unit configured to execute a scanning operation of moving the color measuring unit to pass the color measuring unit over the patches and thus cause the color measuring unit to read a wavelength of reflected light of the patches. The color measuring unit is configured to read light corresponding to a wavelength region selected from within a wavelength region of light divided into a plurality of wavelength regions. The control unit is configured to cause the color measuring unit to read, in one scanning operation, light corresponding to a portion of the plurality of wavelength regions of light to be read, perform a plurality of the scanning operations while changing the wavelength region of light to be read by the color measuring unit, and thus complete colorimetry of the patches.

7 Claims, 14 Drawing Sheets

PRINTING APPARATUS AND COLORIMETRY CONTROL METHOD OF PRINTING APPARATUS

The present application is based on, and claims priority from JP Application Serial Number 2019-055495, filed Mar. 22, 2019, the disclosure of which is hereby incorporated by reference herein in its entirety.

BACKGROUND

1. Technical Field

The present disclosure relates to a printing apparatus and a colorimetry control method of the printing apparatus, and particularly relates to a printing apparatus configured to print patches and measure the color of the printed patches, and a colorimetry control method of the printing apparatus.

2. Related Art

Apparatuses configured to print a plurality of color patches for colorimetry and perform colorimetry on the color patches are known. For example, JP-A-2011-148298 discloses an image processing system configured to improve measurement accuracy of dark patches having low measurement accuracy by increasing a length of the patches in a movement direction of a measuring device and thus increasing a measurement time.

In the technique in the related art described above, although the colorimetric accuracy is increased by increasing the patch area, the problem arises that, when the patch area is increased, the area of the medium required for printing the patches as well as an amount of ink consumption are increased.

SUMMARY

A printing apparatus according to the present disclosure includes a printing unit configured to move in a scanning direction and perform printing on a medium, a color measuring unit configured to move in the scanning direction with the printing unit, and configured to perform colorimetry on patches by reading a wavelength of reflected light from the patches printed on the medium, and a control unit configured to execute a scanning operation of moving the color measuring unit in the scanning direction to pass the color measuring unit over the patches and thus cause the color measuring unit to read a wavelength of reflected light of the patches. The color measuring unit is configured to read light corresponding to a wavelength region selected from within a wavelength region of light divided into a plurality of wavelength regions. The control unit is configured to cause the color measuring unit to read, in one scanning operation, light corresponding to a portion of the plurality of wavelength regions of light to be read, perform a plurality of the scanning operations while changing a wavelength region of the plurality of wavelength regions of light to be read by the color measuring unit, and thus complete colorimetry of the patches.

DESCRIPTION OF EXEMPLARY EMBODIMENTS

Below, exemplary embodiments according to the present disclosure will be described on the basis of the drawings.

Figure 1:
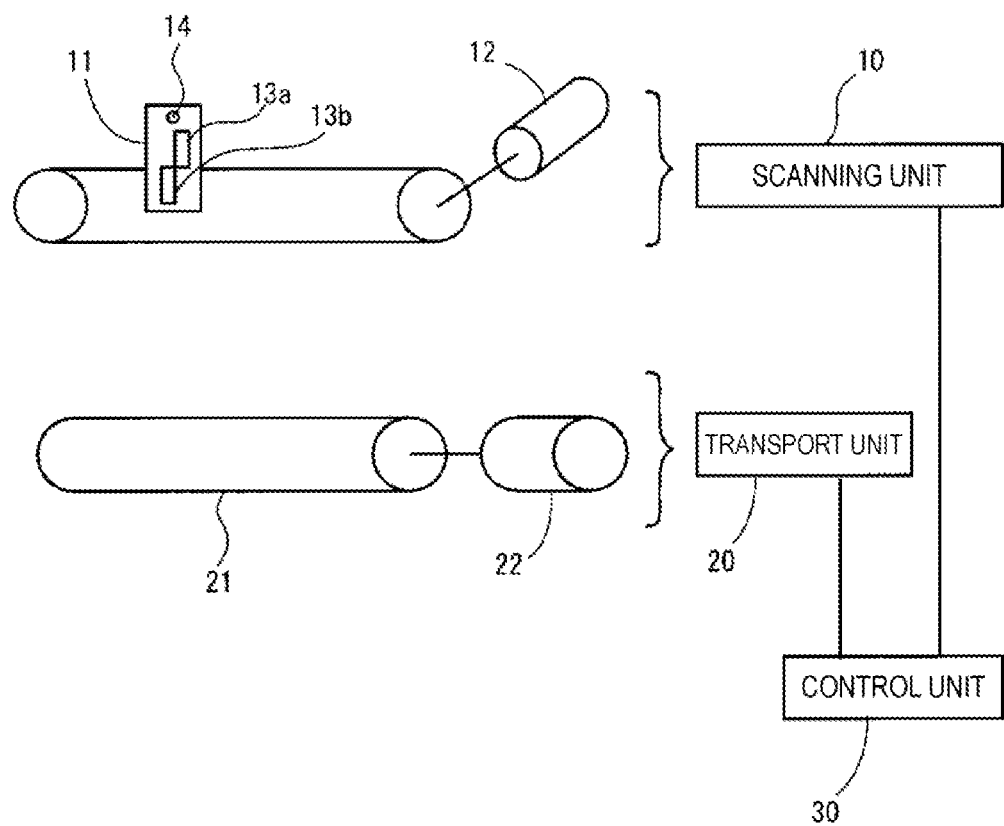
FIG. 1 is a general block diagram of a printing apparatus according to the present disclosure.
Figure 2:
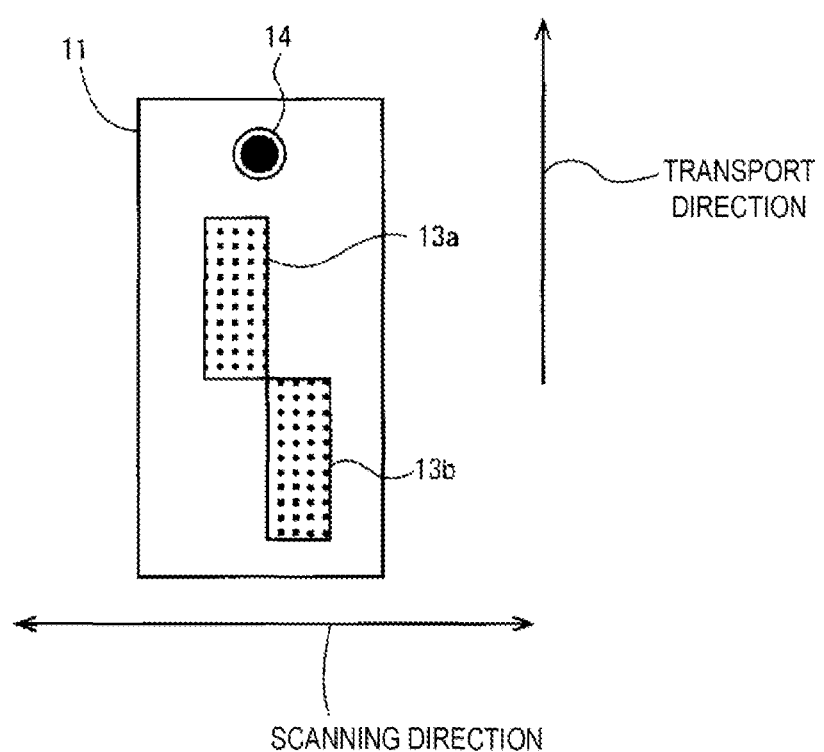
FIG. 2 is a schematic configuration diagram of a print head portion of the printing apparatus according to the present disclosure.
Figure 3:
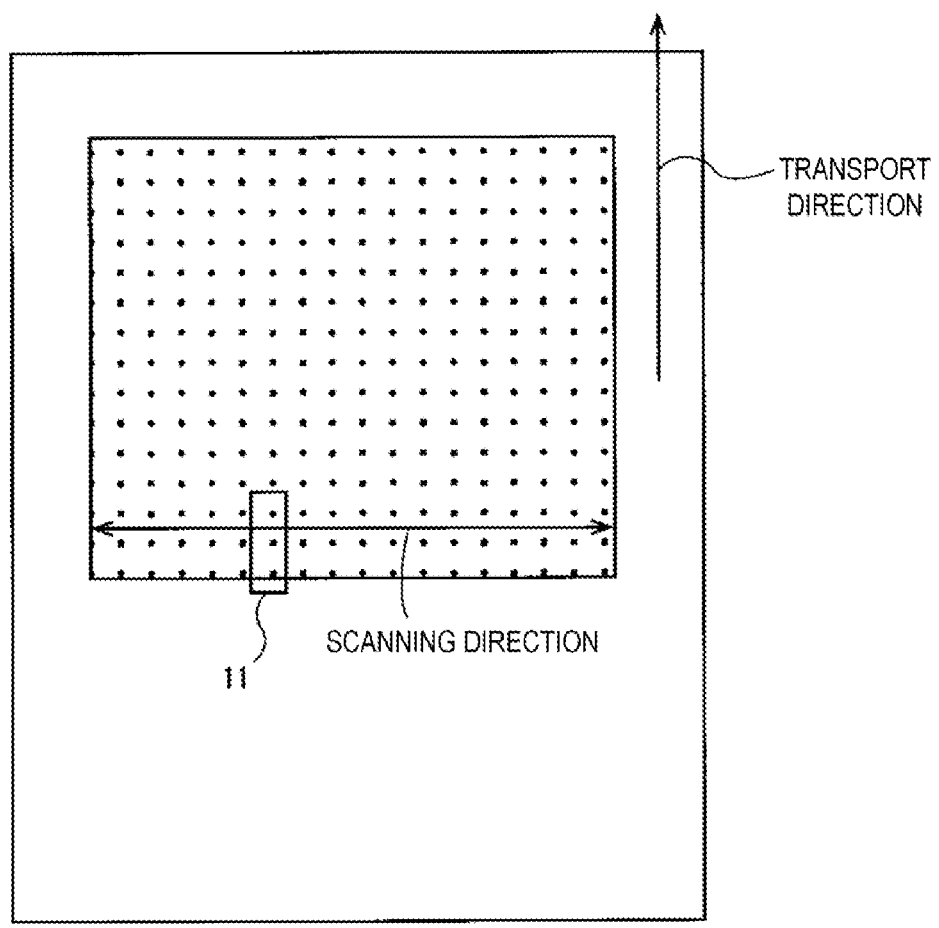
FIG. 3 is a diagram illustrating a relationship between a transport direction of a medium and a scanning direction of a head.

FIG. 1 is a general block diagram of a printing apparatus according to the present disclosure, FIG. 2 is a schematic configuration diagram of a print head portion of the printing apparatus according to the present disclosure, and FIG. 3 is a diagram illustrating a relationship between a transport direction of a medium and a scanning direction of a head.

Specifically, the printing apparatus according to the present exemplary embodiment is an inkjet printer. As illustrated in FIG. 1, the printing apparatus includes a scanning unit 10, a transport unit 20, and a control unit 30.

The scanning unit 10 is configured with a portion thereof reciprocally movable in the scanning direction. As illustrated in FIG. 1, the scanning unit 10 includes a carriage 11 and a carriage motor 12 that drives the carriage 11. The carriage motor 12 is connected to a pulley. A belt is mounted on the pulley and the carriage 11 is attached to the belt. The carriage 11 is configured to be reciprocally movable in the scanning direction by the driving of the carriage motor 12. Note that movement of a portion of the scanning unit 10, that is, the carriage 11, in the scanning direction is also referred to as a "scanning". Further, movement of the carriage 11 one time in the scanning direction is referred to as a single scan, and movement of the carriage 11 in the scanning direction a plurality of times is referred to as a multi-scan.

As illustrated in FIG. 1 and FIG. 2, heads 13a, 13b serving as a printing unit are attached to the carriage 11. A nozzle is formed in each of the heads 13a, 13b in a direction intersecting with the scanning direction. In the present exemplary embodiment, two heads are attached to the carriage 11. However, the number of heads may be one or three or greater.

The heads 13a, 13b are supplied with a plurality of color inks from an ink cartridge (not illustrated). Further, the heads 13a, 13b are configured to be capable of discharging the ink from each of the nozzles. The heads 13a, 13b are capable of printing a predetermined image on a medium facing the heads 13a, 13b by discharging ink from the nozzles when moved in the scanning direction.

The heads 13a, 13b of the present exemplary embodiment are capable of printing a patch for colorimetry. The patch is formed by discharging a predetermined color onto a region having a predetermined shape. Specific examples of patches are described below.

The transport unit 20 is a member configured to transport the medium in the transport direction. As illustrated in FIG. 1, the transport unit 20 includes a transport roller 21 and a transport motor 22 that drives the transport roller 21. The transfer roller 21 is driven by the transport motor 22 to move the medium in the transport direction. As illustrated in FIG. 3, the transport direction is a direction intersecting with the scanning direction. In the present exemplary embodiment, the transport direction and the scanning direction are orthogonal, but being orthogonal is not essential. In the present exemplary embodiment, printed paper is used as the medium. However, a medium other than paper may be used. For example, a variety of materials such as vinyl chloride resin, cloth, or the like can be used.

In the printing apparatus, an image is printed on the medium by alternating an image forming operation of printing a portion of the image on the medium while moving the heads 13a, 13b in the scanning direction, and a transport operation of transporting the medium in the transport direction by the transport unit 20.

Note that the transport unit 20 of the present exemplary embodiment moves the medium in the transport direction, but a transport unit of another configuration may be employed. For example, the transport unit may be configured to move the printing unit in the transport direction with the medium in a fixed state. That is, the transport unit may be configured to move one of the medium and the printing unit relative to the other in the transport direction intersecting with the scanning direction. Further, when a length of the printing unit in a direction orthogonal to the scanning direction is sufficiently long relative to a length of the medium in a direction orthogonal to the scanning direction or the like, it is possible to complete the printing of the image on the medium without moving the medium or the printing unit in the transport direction by the transport unit. Accordingly, the printing apparatus may be configured to not include the transport unit.

Further, as illustrated in FIG. 1 and FIG. 2, a color measuring element 14 serving as a color measuring unit is attached to the carriage 11. The color measuring element 14 is disposed in a position shifted in the transport direction relative to the heads 13a, 13b, causing a predetermined region of the medium to face the heads 13a, 13b and subsequently face the color measuring element 14. In other words, the color measuring element 14 is disposed downstream of the heads 13a, 13b in the transport direction. Accordingly, after a patch is printed by the heads 13a, 13b, the patch is moved to a position facing the color measuring element 14 by the transport operation, making it possible to perform colorimetry on the patch by the color measuring element 14.

Being attached to the carriage 11, the color measuring element 14 is configured to be movable in the scanning direction with the heads 13a, 13b. Note that, in the present exemplary embodiment, the color measuring element 14 and the heads 13a, 13b are attached to the same carriage 11, but both may be attached to different carriages. For example, the configuration may be such that the heads 13a, 13b and the color measuring element 14 are attached to separate carriages, and the carriages are connected by a coupling member or the like. With such a configuration as well, a configuration in which the heads 13a, 13b and the color measuring element 14 are both moved in the scanning direction can be realized.

The color measuring element 14 is capable of performing colorimetry on the patch by reading a wavelength of reflected light of the patch printed on the medium. The color measuring unit 14 is configured to read light corresponding to a wavelength region selected from within a wavelength region of light divided into a plurality of wavelength regions. The color measuring element 14 outputs a signal corresponding to an intensity of incident light in each of the selectable plurality of wavelength regions of light. The color measuring element 14 divides the wavelength region of visible light into 16 wavelength regions in advance, and reads the light corresponding to the wavelength region selected from among these. At this time, the color measuring element 14 is set to read a frequency at a center of the selected wavelength region of light. Note that while "wavelength region" as used herein refers to a range of wavelengths read once by the color measuring element 14, one wavelength region need not be constituted by a set of plurality of wavelengths. When a color measuring element capable of reading only one target wavelength can be used, each wavelength region may be configured by one wavelength. Further, the number by which the wavelength region of light is to be divided is not limited to 16. The number by which the wavelength region of light is to be divided may be 15 or less or 17 or greater.

When each patch is measured, the printing apparatus irradiates the patch with light with the color measuring element 14 facing the patch, and receives the reflected light by the color measuring element 14. The color measuring element 14 outputs a signal for the reflected light received from the patch. The printing apparatus sequentially changes the wavelength region of light to be read in the color measuring element 14, and obtains spectral components of each patch on the basis of the signals respectively obtained in each of the 16 wavelength regions of light. Note that, in the color measuring element 14, when the wavelength region of light to be read is changed, preferably the frequency is gradually increased or the frequency is gradually decreased. When the frequency is increased or decreased as desired, the accuracy may deteriorate due to the effect of hysteresis. Further, to change the wavelength region of light to be read, a predetermined time period is required, and thus there is a limit to the number of wavelength regions of light that can be measured within a predetermined time period.

Note that the color measuring element 14 according to the present exemplary embodiment includes a wavelength variable interference filter, and is configured to use this to change the wavelength region of light to be read. The wavelength variable interference filter is specifically a wavelength variable type Fabry-Perot-Etalon element. More specifically, the color measuring unit of the present exemplary embodiment employs a configuration such as that of the spectrometer disclosed in JP-A-2016-176910.

The control unit 30 controls the operation of the scanning unit 10 and the transport unit 20, and controls the overall printing and colorimetry. The main configuration of the control unit 30 includes a central processing unit (CPU), a read-only memory (ROM), a random-access memory (RAM), an input/output (I/O), an operating panel, a display, and the like, and is a computer. The control unit 30 stores a prescribed program, and executes the program to realize a predetermined function.

Here, the control unit 30 is configured to be capable of performing a scanning operation of moving the color measuring element 14 in the scanning direction to pass the color measuring element 14 over the patches and thus cause the color measuring element 14 to read the wavelength of the reflected light of the patches.

Figure 4:
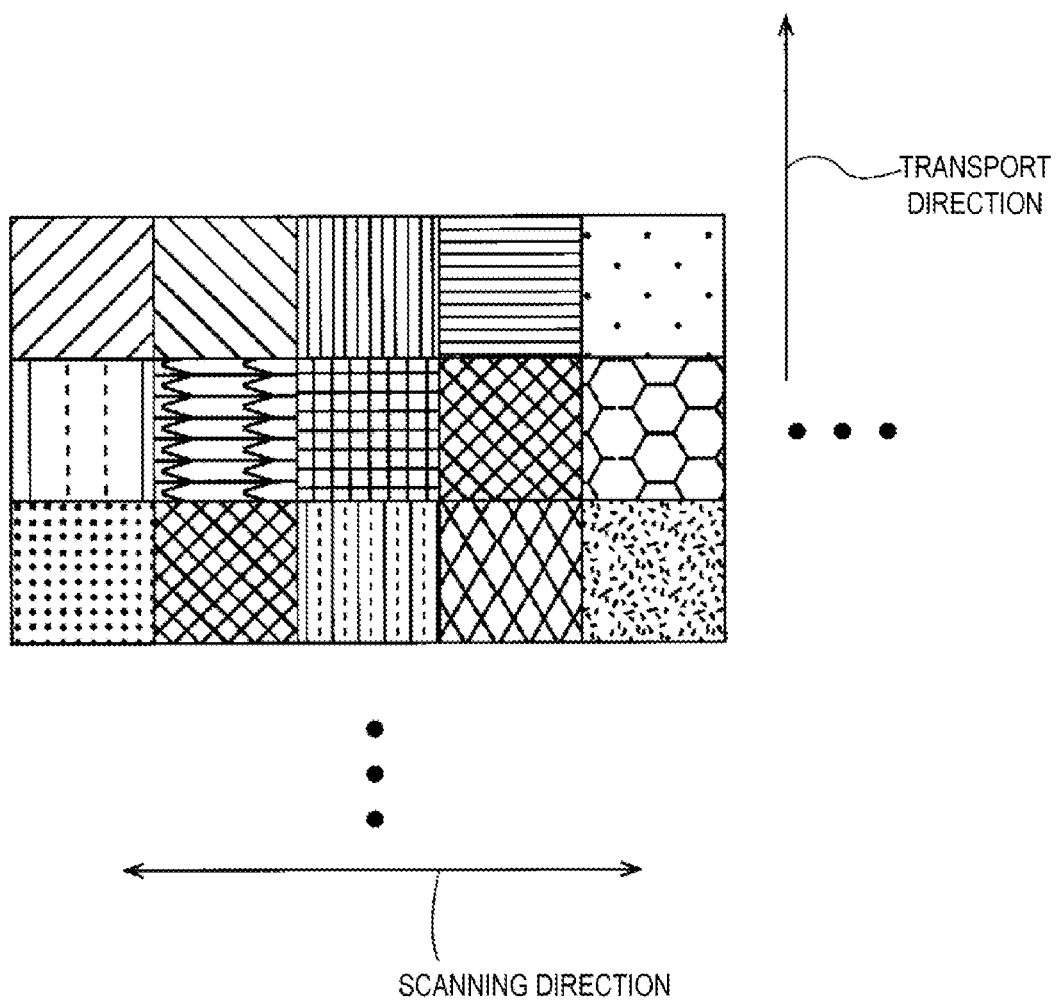
FIG. 4 is a diagram illustrating a general arrangement of patches.

FIG. 4 is a diagram illustrating a general arrangement of patches. Although the number of patches illustrated in FIG. 4 disposed in the scanning direction×the transport direction is five×three, that is, 15 patches, this arrangement is merely an example. Note that one patch corresponds to the color of one color.

The color measuring element 14 can perform colorimetry in only one wavelength region of light at a time, and separately performs colorimetry on the 16 wavelength regions of light by changing the wavelength region of light to be read.

In order to perform colorimetry on the 16 wavelength regions of light while the carriage 11 is moved in the scanning direction at a predetermined travel velocity, a size of the patch in the scanning direction must be large, but colorimetry using a technique described later makes it is possible to perform measurement at a predetermined accuracy without increasing the size of the patch.

Figure 5:
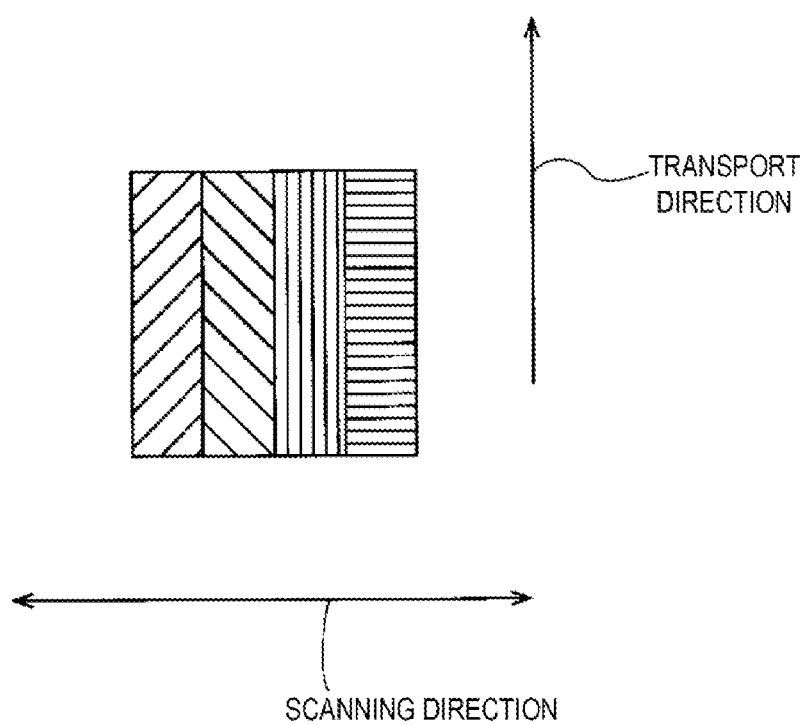
FIG. 5 is a diagram illustrating an arrangement of patches made vertically long.

FIG. 5 is a drawing illustrating an arrangement of patches made vertically long. The patches illustrated in FIG. 4 are generally square, while the patches illustrated in FIG. 5 are vertically-long rectangles. The term "vertically-long" as used herein refers to a relationship in which a length in the transport direction is greater than a length in the scanning direction. That is, the patches illustrated in FIG. 5 each have a length in the transport direction that is longer than a length in the scanning direction.

When the patches are shortened in the scanning direction, the number of wavelength regions of light subject to colorimetry by the color measuring element 14 in one scan is decreased. However, even when the medium is transported by the transport operation with the patches vertically long, the chance of the color measuring element 14 scanning the same patch increases. As a result, as long as the length in the transport direction is lengthened to the extent that the length in the scanning direction is short, the number of measurable wavelength regions of light can be made the same. As an example, a square patch having a length in the scanning direction×a length in the transport direction of 2 cm×2 cm, and a rectangular patch having a length in the scanning direction×a length in the transport direction of 1 cm×4 cm, have the same area and the time required to pass over each patch can be made the same. Thus, the number of measurable wavelength regions of light does not change. This is a description for ease of understanding and, needless to say, the number of measurable wavelength regions of light is actually determined by other elements such as the travel velocity of the carriage 11.

Figure 6:
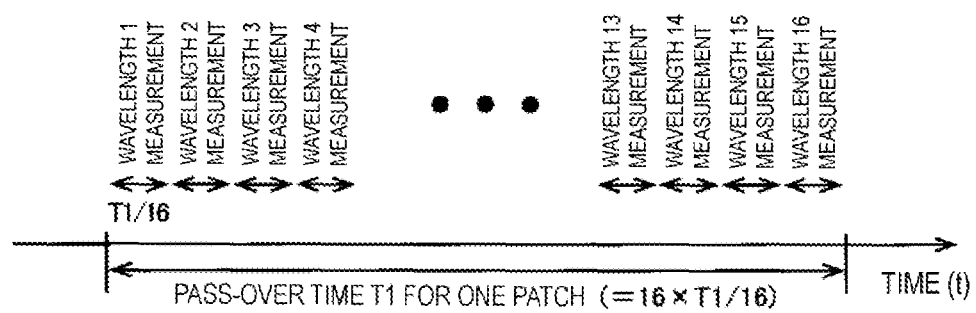
FIG. 6 is a diagram illustrating a patch pass-over time when colorimetry is performed on 16 wavelength regions of light in one scan.

FIG. 6 is a diagram illustrating a patch pass-over time when colorimetry is performed on 16 wavelength regions of light in one scan. That is, FIG. 6 illustrates when the color measuring element 14 reads the wavelength region of light divided into 16 wavelength regions while changing the wavelength region in 16 stages during one scan. Here, the time required for the color measuring element 14 to pass over one patch in one scan is defined as a pass-over time T1. In FIG. 6, the time axis is shown as a rightward arrow and the pass-over time T1 is displayed in correspondence with this time axis. As illustrated in FIG. 6, the colorimetry time of each wavelength region on the time axis when colorimetry is performed on 16 wavelength regions of light during the pass-over time T1 is T1/16.

The color measuring element 14 is given a wavelength of light or a frequency of light as a target to be measured. Then, the color measuring element 14 measures the intensity of incident light at the given wavelength, and outputs a signal representative of the intensity. At this time, the intensity is not only strictly affected by the given wavelength, but also by the incident light of the wavelengths before and after the given wavelength. Therefore, the intensity of incident light in a wavelength region including the wavelengths before and after the given wavelength is actually measured. However, for convenience of explanation, the wavelength region of light to be measured is also referred to as the wavelength of light to be measured. The 16 wavelength regions of light are referred to as wavelength 1, wavelength 2, and wavelength 3 . . . in order, starting from the shortest wavelength. In this way, as illustrated in FIG. 6, on the time axis, measurement of the wavelength of light starts from the measurement of wavelength 1, that is, the "wavelength 1 measurement", and continues until the measurement of the wavelength 16, that is, the "wavelength 16 measurement".

The steps taken to measure a certain wavelength of light include specifying the wavelength of light to be measured, switching the transmission wavelength of the color measuring element 14 in accordance with the specified wavelength of light, and measuring the intensity of incident light after switching, each step requiring a predetermined time period. In particular, "switching the transmission wavelength of the color measuring element 14 in accordance with the specified wavelength of light" involves an operation of changing an interval between two reflective films in a wavelength variable interference filter, and thus requires time for completion. Therefore, as illustrated in FIG. 6, as long as the time required for the color measuring element 14 to pass over one patch is longer than the time required to measure the 16 wavelength regions of light, the 16 wavelength regions of light can be measured in one scan. However, when the time required for the color measuring element 14 to pass over one patch is shorter than the time required to measure the 16 wavelength regions of light, the 16 wavelength regions of light cannot be measured in one scan. This also depends on the shape of the patch.

Figure 7:
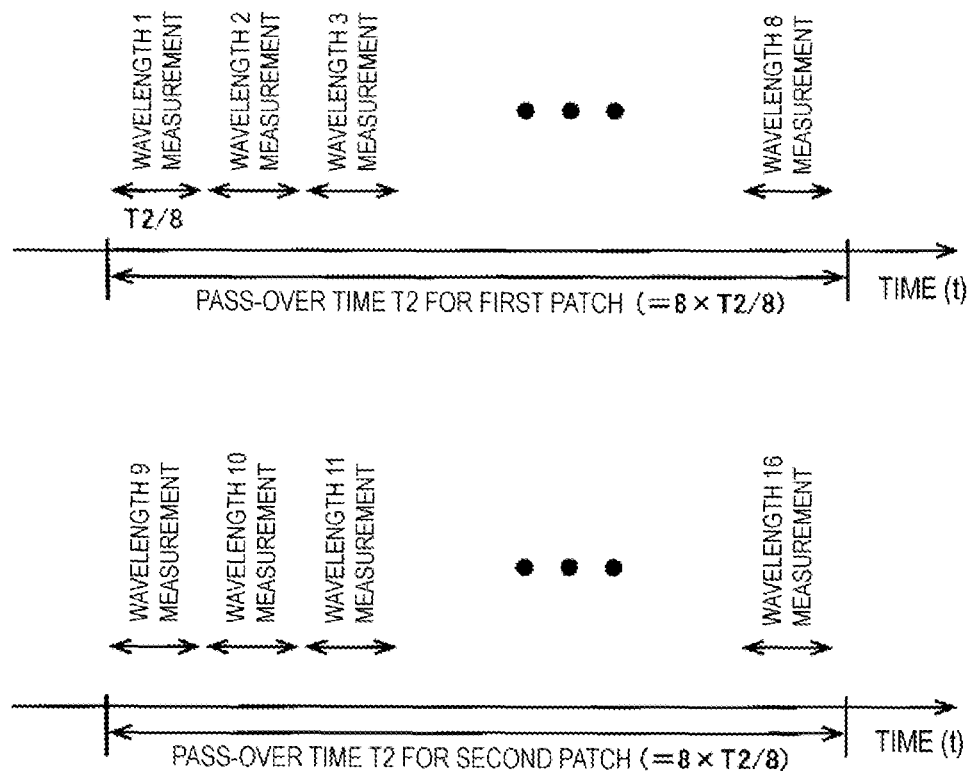
FIG. 7 is a diagram illustrating the patch pass-over time when colorimetry is performed on eight wavelength regions of light in one scan.

FIG. 7 is a diagram illustrating the patch pass-over time when colorimetry is performed on eight wavelength regions of light in one scan. That is, FIG. 7 illustrates when the color measuring element 14 reads the wavelength region of light divided into eight wavelength regions while changing the wavelength region in eight stages during one scan, and executes two scans per patch to read the 16 wavelength regions of light. Specifically, the color measuring element 14 reads light corresponding to wavelength 1 to wavelength 8 in a first scan, and reads light corresponding to wavelength 9 to wavelength 16 in a second scan. By dividing the 16 wavelength regions of light in half and scanning each of the eight wavelength regions of light twice, it is possible to perform colorimetry on the 16 wavelength regions of light overall. Here, the time required for the color measuring element 14 to pass over one patch in one scan is defined as a pass-over time T2. In FIG. 7, the time axis is shown as a rightward arrow and the pass-over time T2 is displayed in correspondence with this time axis. As illustrated in FIG. 7, because colorimetry is performed on the eight wavelength regions of light during the pass-over time T2, the colorimetry time of each wavelength region of light is T2/8. In FIG. 7, the upper area illustrates the execution of wavelength 1 measurement to wavelength 8 measurement by the first scan, and the lower area illustrates execution of wavelength 9 measurement to wavelength 16 measurement by the second scan.

Thus, the control unit 30 is configured to cause the color measuring element 14 to read light corresponding to a portion of a wavelength region of light to be read in one scanning operation, perform a plurality of the scanning operations while changing the wavelength region of light to be read by the color measuring unit 14, and thus complete colorimetry of the patches.

Further, in the printing apparatus according to the present exemplary embodiment, colorimetry is performed using a method such as the following. That is, the method includes the steps of, when a scanning operation of moving the color measuring element 14 in the scanning direction to pass the color measuring element 14 over the patches and thus cause the color measuring element 14 to read the wavelength of the reflected light of the patches can be executed, causing the color measuring element 14 to read light corresponding to a portion of a wavelength region of light to be read in one scanning operation, performing a plurality of scanning operations while changing the wavelength region of light to be read by the color measuring unit 14, and thus completing colorimetry of the patches.

When the patches are measured as described above, one patch can be read by a plurality of scanning operations, making it possible to suppress a lengthening of each patch in the scanning direction. Thus, a colorimetric accuracy can be improved without increasing the patch area.

In each of the examples in FIG. 6 and FIG. 7, there are a plurality of the wavelength regions of light to be measured in a one scan. That is, the control unit 30 performs control so that the light corresponding to a plurality of wavelength regions is read by the color measuring element 14 in one scanning operation. In the present exemplary embodiment, such a colorimetry mode is referred to as a "multi-wavelength region mode". In other words, the control unit 30 is configured to be capable of executing a multi-wavelength region mode in which the light corresponding to a plurality of wavelength regions is read by the color measuring element 14 in one scanning operation.

When FIG. 6 and FIG. 7 are compared, the measurement time available for each wavelength is T1/16 for the 16 wavelength regions of 16 light illustrated in FIGS. 6, and T2/8 when the eight wavelengths of light illustrated in FIG. 7 are scanned twice, the latter being longer.

Figure 8:
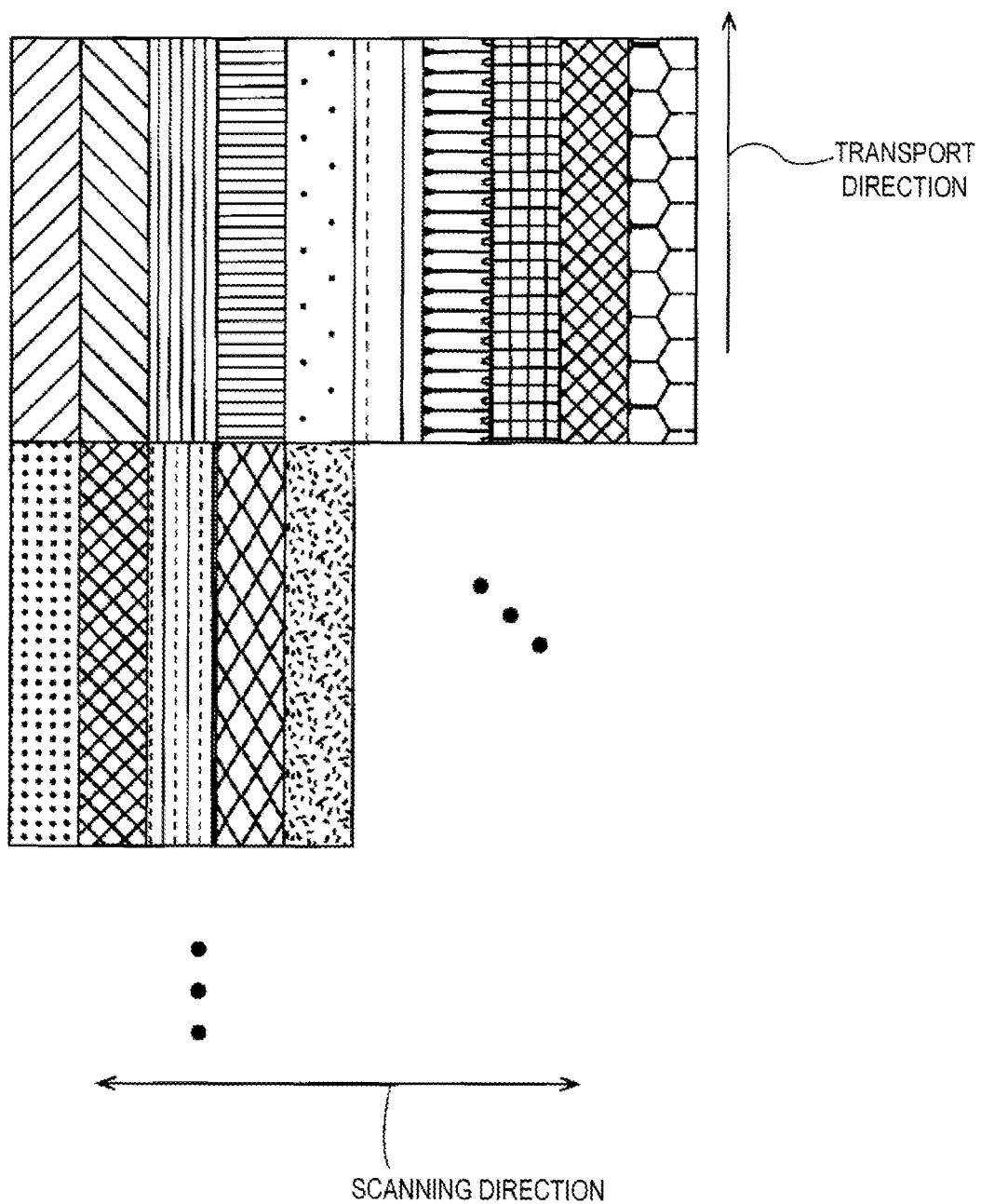
FIG. 8 is a diagram illustrating an arrangement of patches when colorimetry is performed on one wavelength region of light in one scan.

Further, in the printing apparatus according to the present exemplary embodiment, the control unit 30 is configured to be capable of executing a single-wavelength region mode in which the light corresponding to one wavelength region is read by the color measuring element 14 in one scanning operation. FIG. 8 is a diagram illustrating an arrangement of patches when colorimetry is performed on one wavelength region of light in one scan, and FIG. 9 is a diagram illustrating wavelength switching sections when colorimetry is performed on one wavelength region of light in one scan.

When colorimetry is performed on only one wavelength region of light in one scan, 16 scans are required to perform colorimetry on the 16 wavelength regions of light. In this case, the wavelength of light to be measured is switched once per scan. In contrast, in the multi-wavelength region mode, the number of times the wavelength of light to be measured is switched per scan is 16 in the example illustrated in FIG. 6, and eight in the example illustrated in FIG. 7. As described above, switching the wavelength of light to be measured requires a predetermined time period, and thus the single-wavelength region mode allows the time required for one scan to be shortened compared to multi-wavelength region mode.

Figure 9:
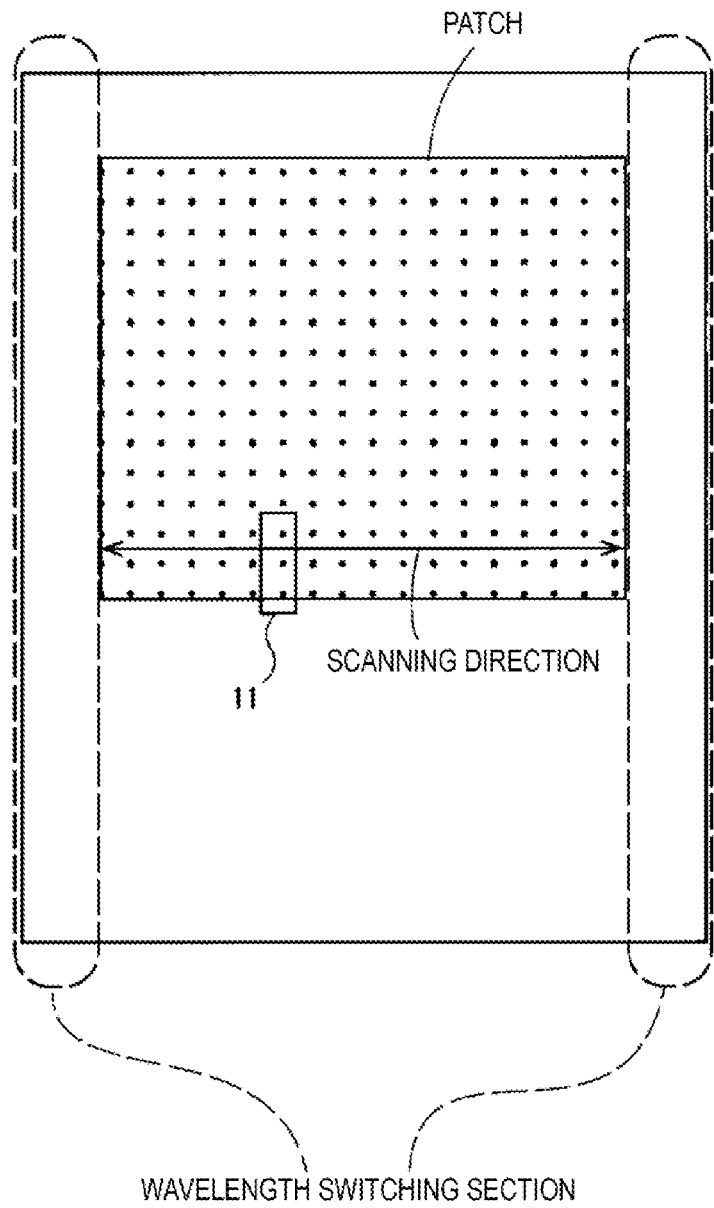
FIG. 9 is a diagram illustrating wavelength switching sections when colorimetry is performed on one wavelength region of light in one scan.

Note that, as illustrated in FIG. 9, the wavelength of light to be measured is switched at both ends in the scanning direction in a travel range of the carriage 11. When the carriage 11 is moved, the sections at both ends in the scanning direction are acceleration sections, and are regions where the velocity changes. Therefore, when this section is not used for colorimetry, the color measuring element 14 performs colorimetry only when moving at a constant speed, and the time required for the colorimetry of one patch is constant. With the time required for colorimetry being constant, the width of the patch can also be constant. If the section involves a changing velocity, the width of the patch is not constant.

Note that in the printing apparatus according to the exemplary embodiment, the control unit 30 is configured to be capable of executing both the multi-wavelength region mode and the single-wavelength region mode as a colorimetry mode. The user selects either colorimetry mode when executing colorimetry. However, the configuration may be such that only one of the multi-wavelength region mode and the single-wavelength region mode is provided as the colorimetry mode. Further, the configuration may be such that a mode other than the two modes described above is provided as the colorimetry mode.

Figure 10:
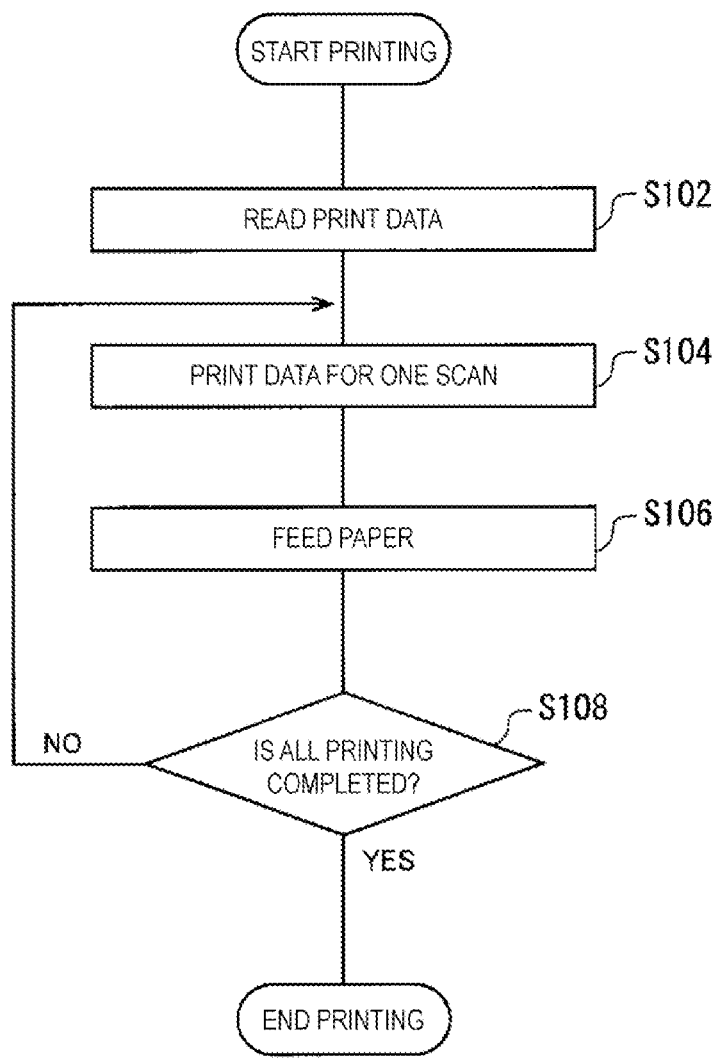
FIG. 10 is a flowchart executed by the printing apparatus according to the present disclosure.
Figure 11:
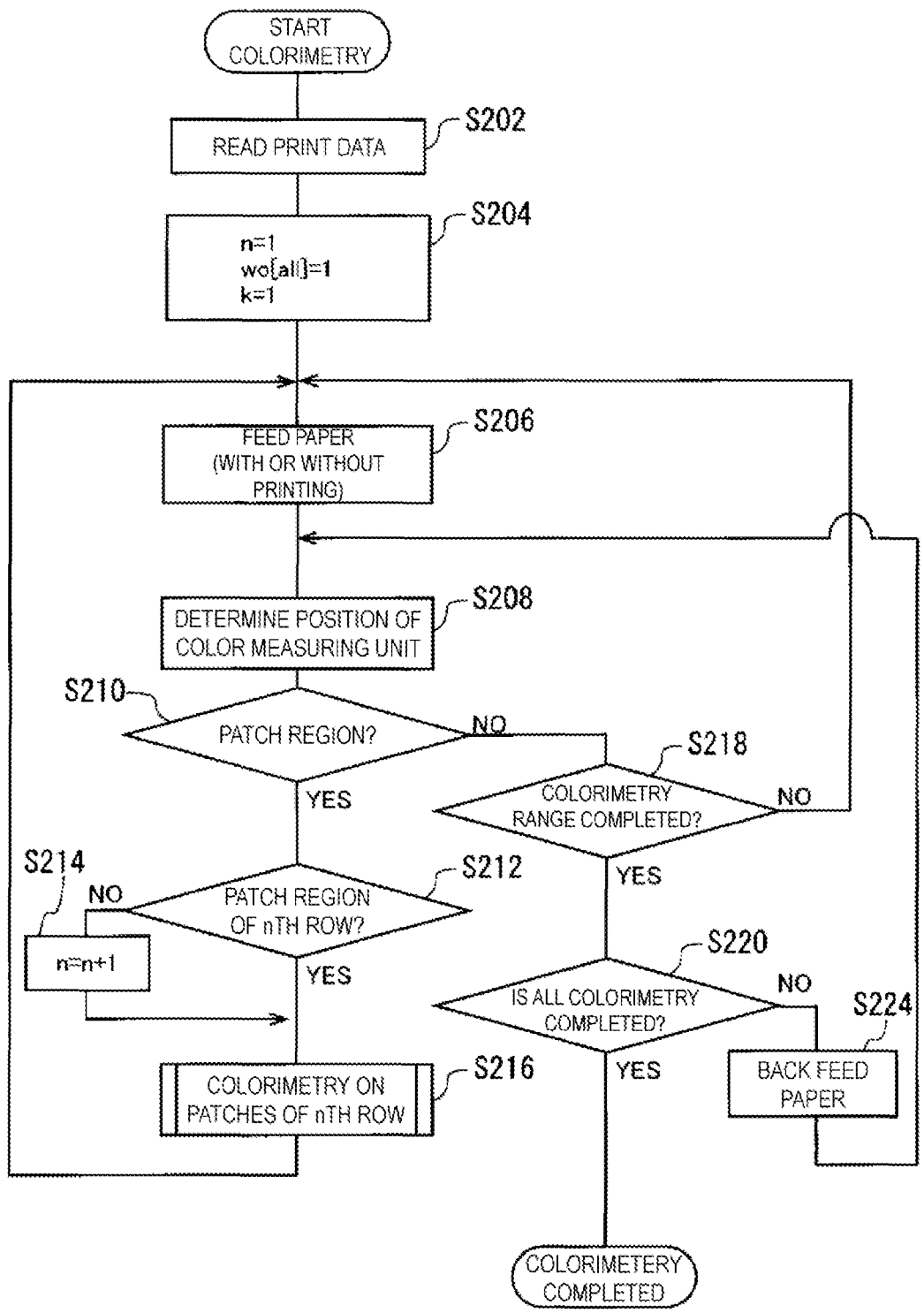
FIG. 11 is a flowchart executed by the printing apparatus according to the present disclosure.
Figure 12:
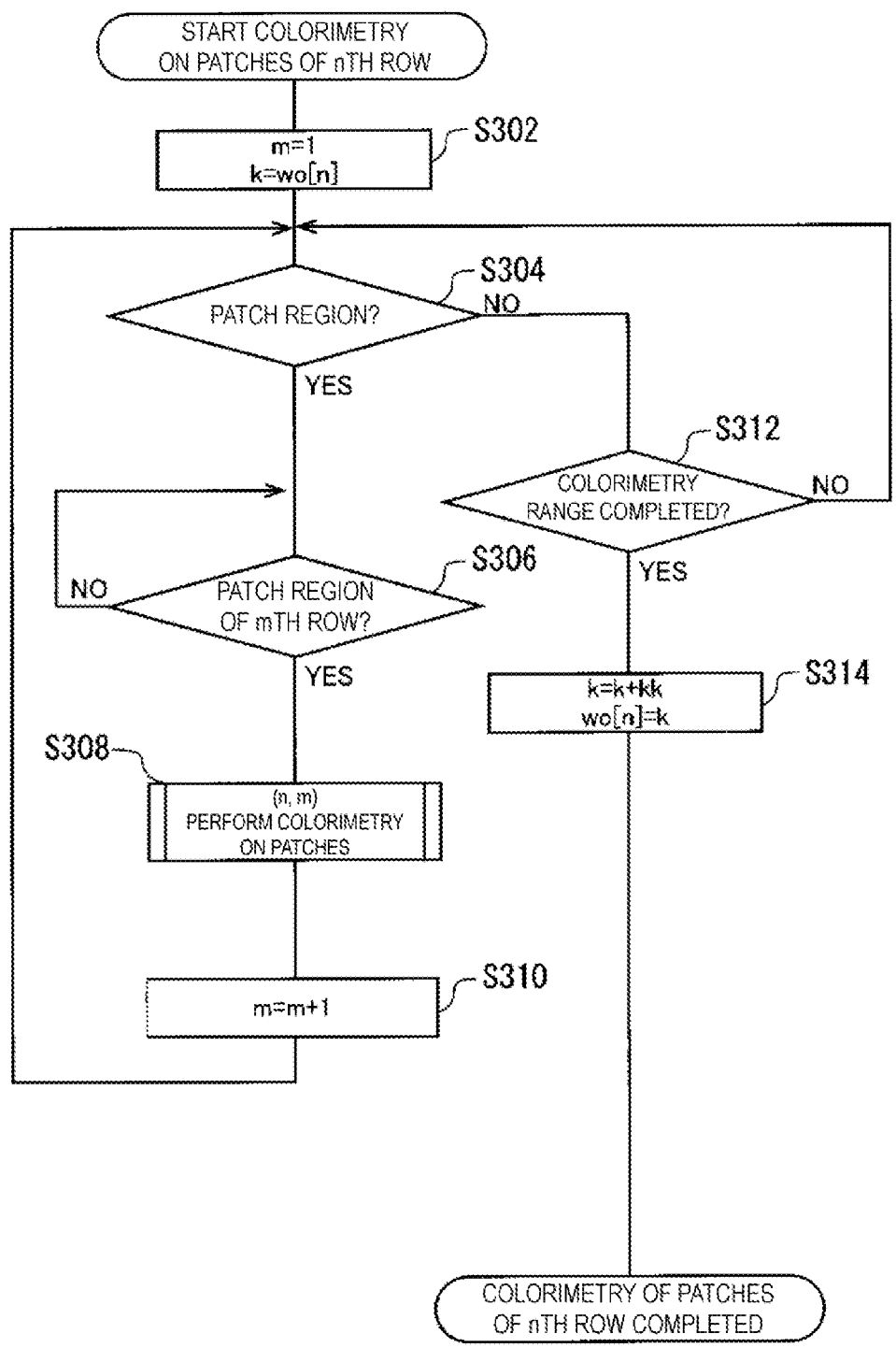
FIG. 12 is a flowchart executed by the printing apparatus according to the present disclosure.
Figure 13:
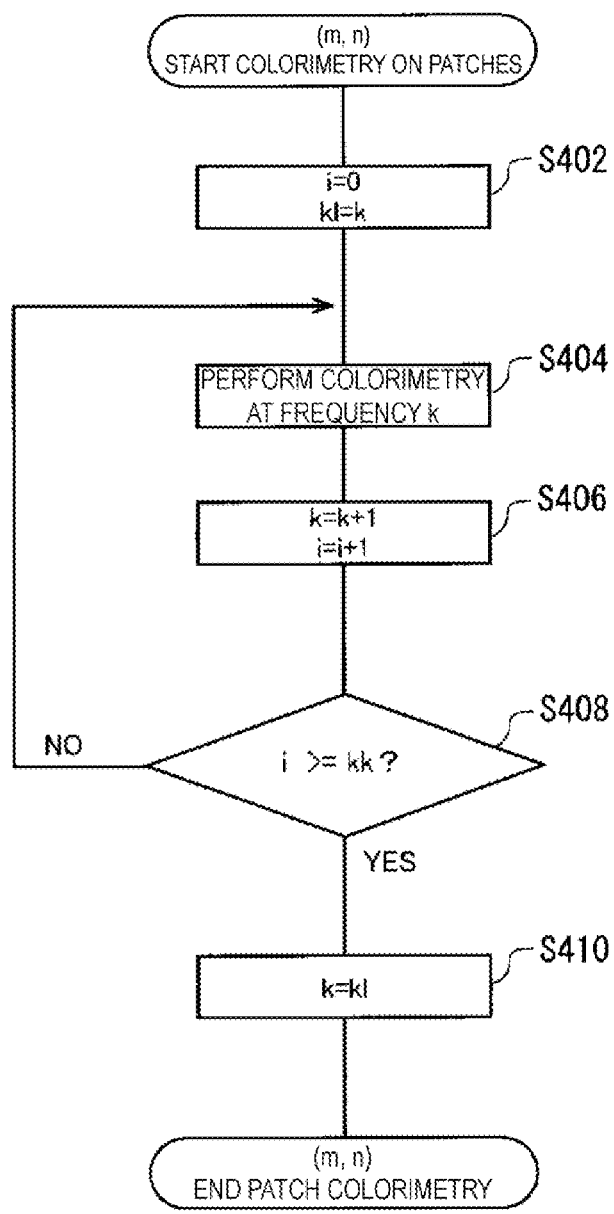
FIG. 13 is a flowchart executed by the printing apparatus according to the present disclosure.

FIG. 10 to FIG. 13 are flowcharts executed by the printing apparatus according to the present disclosure. FIG. 10 is a flowchart of a printing process, and FIG. 11 to FIG. 13 are flowcharts of a colorimetry process.

The control unit 30 performs the printing and colorimetry processes in accordance with these flowcharts.

The printing process illustrated in FIG. 10 is a process for printing a patch. The control unit 30 reads print data in step S102, and performs printing on the basis of the data of one scan in step S104. Subsequently, in step S106, the control unit 30 executes paper feeding, that is, the transport operation of the medium, and, in step 108, determines whether all printing has been completed, ends the printing process when completed, and repeats the processes of steps 104 and thereafter for the next scan when not completed. As a result, the process of printing the patches of one scan, feeding the paper, printing the patches of the next scan, and feeding the paper is repeated until the patches of the last scan are printed.

The printing process can be achieved by transporting the medium in the transport direction by the transport unit 20 while driving the heads 13a, 13b to reciprocate in the scanning direction by the scanning unit 10.

The control unit 30 performs the printing process while concurrently performing the colorimetry process illustrated in FIG. 11 to FIG. 13. While the printing process is prioritized and predetermined printing is performed, the colorimetry process is performed to the extent executable by the color measuring element 14 without hindering this printing. The patches are arranged in rows and columns with positions in the transport direction being "rows" and positions in the scanning direction being "columns", and thus the nth row and the mth row are displayed and identified as (n, m)

for convenience. Colorimetry requires specification of a wavelength of light or a frequency of light to be measured, and the wavelength of light to be measured is defined as k. In the present exemplary embodiment, the wavelength region of light to be measured is divided into 16 regions, and thus k=1 to 16. At this time, the specified frequency is displayed in an array W(k). Further, in the patches of the nth row, an argument of the array for specifying the frequency when the scan is started is expressed by wo(n).

The control unit 30 reads the print data in step S202, and sets the initial value in a variable for colorimetry in step S204. The variable n for looping is set to "1", the argument wo(all) for indicating the frequency at the start of the scan in each row, that is, each wo(n), is set to "1", which is the initial value, and the variable k specifying the first light wavelength of light or frequency of light is set to "1". Note that a variable kk sets number of wavelengths of light or frequencies of light subject to colorimetry in one scan. kk is "16" in the example illustrated in FIGS. 6, and "8" in the example illustrated in FIG. 7. Further, when the 16 wavelength regions of light are measured by performing colorimetry four times for each of four wavelength regions of light, kk is set to 4.

In step S206, the control unit 30 performs paper feeding, that is, the medium transport operation. This is performed as a part of the process of printing when printing is performed, and as paper feeding for colorimetry when printing is not performed. When printing is performed, in step 208 the position of the color measuring element 14, which is the color measuring unit, is determined. On the basis of the information of the acquired position, in step S210, the control unit 30 determines whether the color measuring element 14 is positioned in a patch region, and, when the color measuring element 14 is in the patch region, in step S212, the control unit 30 determines whether the color measuring element 14 is positioned in the patch region of the nth row serving as a current scan target. Then, when the color measuring element 14 is in the patch region of the nth row serving as the current scan target, in step 216, the patches of the nth row are subject to colorimetry. In step S212, the control unit 30 determines that the color measuring element 14 is not in the patch region of the nth row when colorimetry of the nth row has been completed and thus, in step S214, the control unit 30 increments the variable n by "1" in order to perform scanning and colorimetry in the next row. Then, on the basis of the variable n having the content is n+1, colorimetry of the patches of the nth is performed in step S216.

When, after determining the colorimetry position in step S208, the control unit 30 determines in step S210 that the color measuring element 14 is not positioned in the patch region, the control unit 30 determines in step S218 whether the colorimetric range is completed. An incomplete colorimetric range means that colorimetry has not yet been performed on all patch regions in the transport direction, and the patch regions where colorimetry is incomplete can be measured by performing paper feeding. Thus, the process returns to step S206 and predetermined paper-feeding is performed to repeat the processing described above. On the other hand, when the colorimetric range is completed, the control unit 30 determines in step S220 whether or not all colorimetry is completed. When the colimetric range is completed but all colorimetry is not, the situation is such that the printing of the patches is completed, colorimetry has been performed in areas where colorimetry could be performed in parallel with printing, but colorimetry of all patches is not yet completed. Examples include when, in some or all patches, only eight of the 16 wavelength regions of light to be read have been read, and the like. In this case, the patches included in the wavelength regions of light not read need to once again be caused to face the color measuring element 14, and the wavelength regions of light of the patches not read need to be read. In such a case, in step S224, the paper back-feeding is performed. The term "paper back-feeding" refers to back-feeding the paper on which the patches are printed to allow the color measuring element 14 to face the start of the patch region. The term "back-feeding" refers to causing the transport unit 20 to move the medium in a direction opposite to the transport direction. In this case, the length to be back-fed may be the length to the start of the patch region, and thus patches not yet measured may be identified and the paper may be back-fed in an amount equivalent to the length at which the color measuring element 14 faces the patches not yet measured. Note that, when a transport unit that moves the printing unit rather than the medium in the transport direction is used, moving the printing unit in the direction opposite to the transport direction is equivalent to "back-feeding".

When back-feeding is thus performed, the printing process is fully completed. Thus, as long as the carriage 11 is moved in the scanning direction and the medium is gradually moved in the transport direction, colorimetry of all patches is possible. Note that, in the present exemplary embodiment, only the patches not yet measured are measured as described below.

After back-feeding, printing is not required; only colorimetry need be performed. At this time, the travel velocity of the carriage 11 is the same before and after back-feeding. In other words, the travel velocity of the carriage 11 when colorimetry is performed on the patches while printing is performed on the medium is the same as the travel velocity of the carriage 11 when colorimetry is performed on the patches without printing being performed on the medium. Colorimetry of certain wavelengths of light by the color measuring element 14 requires a predetermined time period, and thus, when the travel velocities of the carriage 11 are different before and after back-feeding, colorimetry control is impacted. To eliminate such impact, the travel velocity of the carriage 11 is made the same before and after back-feeding, making it possible to avoid complexities in control.

In this way, when, after the control unit 30 causes the transport unit to move the medium in the transport direction and all patches subject to colorimetry have passed through the position facing the color measuring element 14, there is a wavelength region of light of the patches not read, the control unit 30 causes the transport unit to move the medium in a direction opposite to the transport direction and the color measuring element 14 to read the wavelength region of light of the patches not read.

Further, the specific processing of the colorimetry of the patches of the nth row performed in step S216 is illustrated in the flowchart of FIG. 12.

The patches of the nth row exist in m columns, and thus, in order to sequentially perform colorimetry, the variable m is set to "1" in step S302. Further, to set the frequency at which colorimetry is to be started, the variable k is set to the value of the variable wo(n) representing the starting position of the argument of the wavelength of light prepared in advance. When colorimetry is performed in the nth row for the first time, "1" set in step S204 in advance is set in wo(n).

After each variable is set, in step S304, the control unit 30 determines whether the current position of the color measuring element 14 is in the patch region and, when in the patch region, determines in step S306 whether the position corresponds to the patch region of the mth column subject to colorimetry. When the position of the color measuring element 14 is in the patch region of the m-th column, in step S308, colorimetry is performed on the patches in the mth column of the nth row, that is, the position (n, m). Once this colorimetry is completed, in step S310, the variable m is incremented by "1" and the processes of step S304 and thereafter are repeated. In steps S304 to S310, the variable m is sequentially incremented from 1 and the process is repeated until the colorimetric range of the patches aligned in the nth row is completed.

When all colorimetric ranges of the patches aligned in the nth row are measured, it is determined in step S304 that the color measuring element 14 is outside the patch region, and thus the control unit 30 determines in step S312 whether the colorimetric range is completed. If the colorimetric range is completed, in step S314, as the argument representing the wavelength of light for which colorimetry is to be started in the next scan, the value of the variable kk representing the number of wavelengths of light subject to colorimetry in one scan is added to the value of the argument k at the start of the current scan, and the sum is set in the variable k. This argument k is initialized during the (n+1)th scan, and thus the value of the argument k is set to the variable wo(n) to store the wavelength of light not measured in the nth row, and ends the processing of patch colorimetry in the nth row. When the nth patch is then scanned, in step S302, the value of the variable wo(n) representing the starting position of the argument of the wavelength of light is first set in the variable k, and thus the process ends without performing colorimetry on the wavelengths of light already completed. For example, when the number of wavelengths of light measured in one scan is eight, that is, kk=8, light corresponding to wavelength 1 to wavelength 8, that is, k=1 to k=8, of a certain patch is read while printing is performed on the medium. In step S314, k=1+8 is reached and wo(n) is set to 9. Then, after back-feeding in step S224 illustrated in FIG. 11 is performed and the color measuring element 14 again faces the patch, wo(n) is 9 and thus measurement from can be started from wavelength 9.

The process by which colorimetry is actually performed in step S308 is illustrated in the flowchart of FIG. 13. In step S402, a variable i for determining the number of loops is reset to "0" and the value of argument k is set in a variable kl for storing the initial value of k.

In step S404, colorimetry of the wavelength or frequency of light specified by argument k is performed. Specifically, a procedure is followed in which, the color measuring element 14 is given a value of the argument k specifying a wavelength W(k) or the same wavelength of light to be measured and caused to prepare for colorimetry and, after colorimetry preparation is completed, caused to measure the intensity of the incident light. Once the measurement result is obtained, that value is acquired. When colorimetry is completed, in step S406, the value of the argument k specifying the wavelength of light to be measured is incremented by "1" and, to ensure that the number of wavelengths of light to be measured in one scan is not exceeded, the value of the variable i is incremented by "1".

In step S408, the value of the variable kk set to the number of wavelengths to be measured in one scan is compared with the argument i indicating the number of wavelengths of light subject to colorimetry. When the number of wavelengths of light subject to colorimetry in one scan is exceeded, there is no longer a need to change the wavelength of light and perform colorimetry and thus, in step S410, the stored variable kl is set in the variable k representing the starting wavelength of light in the next colorimetry, and the processing is ended.

In this way, in the flowchart illustrated in FIG. 11, the color measuring element 14 serving as the color measuring unit is determined to be in the nth patch region, and colorimetry of the nth row is started in step S216. Then, in accordance with the flowcharts illustrated in FIG. 12 and FIG. 13, as the carriage 11 moves in the scanning direction, the color measuring element 14 repeatedly performs colorimetry for a predetermined number of light wavelengths in a state of facing the individual patches.

When one scan is finished and the colorimetric range is completed, colorimetry is completed for the number of wavelengths of light scheduled to be measured in one scan. Next, when colorimetry of the nth row is started in step S216, colorimetry is performed for the remaining wavelengths of light that have not yet been measured in an amount equivalent to the number of wavelengths of light scheduled to be measured in one scan.

As long as the conditions that allow colorimetry are met while patches are first printed, colorimetry is performed as described above. In each scan, while there are cases in which colorimetry cannot be performed on all wavelength regions of light of the patches to be read, the next scanning opportunity is utilized to perform colorimetry on the wavelength regions of light not previously read. For example, if the length of the patch in the transport direction is sufficiently longer than the length in the transport direction of the heads 13a, 13b, the opportunity to scan the same patch multiple times is likely to occur. At this time, in any scan, the color measuring element 14 performs colorimetry in an amount equivalent to the number of wavelengths of light scheduled to be measured in one scan.

If all colorimetry is not completed by the time printing is completed, the paper is back fed in step S224 so that colorimetry can be performed on patches that have not been measured and, without printing being performed thereafter, scanning in the scanning direction for colorimetry and movement of the medium in the transport direction are repeated to perform colorimetry on the patches not yet measured. In this case as well, colorimetry is repeated for the number of wavelengths of light scheduled to be measured in one scan. Note that examples of "all colorimetry is not completed" include when, in some or all patches, only a portion of a plurality of wavelength regions to be read have been read, and the like. Further, "patches not yet measured" refers to patches for which colorimetry has not been fully completed, and includes patches for which only a portion of the wavelength regions of light have been read.

Figure 14:
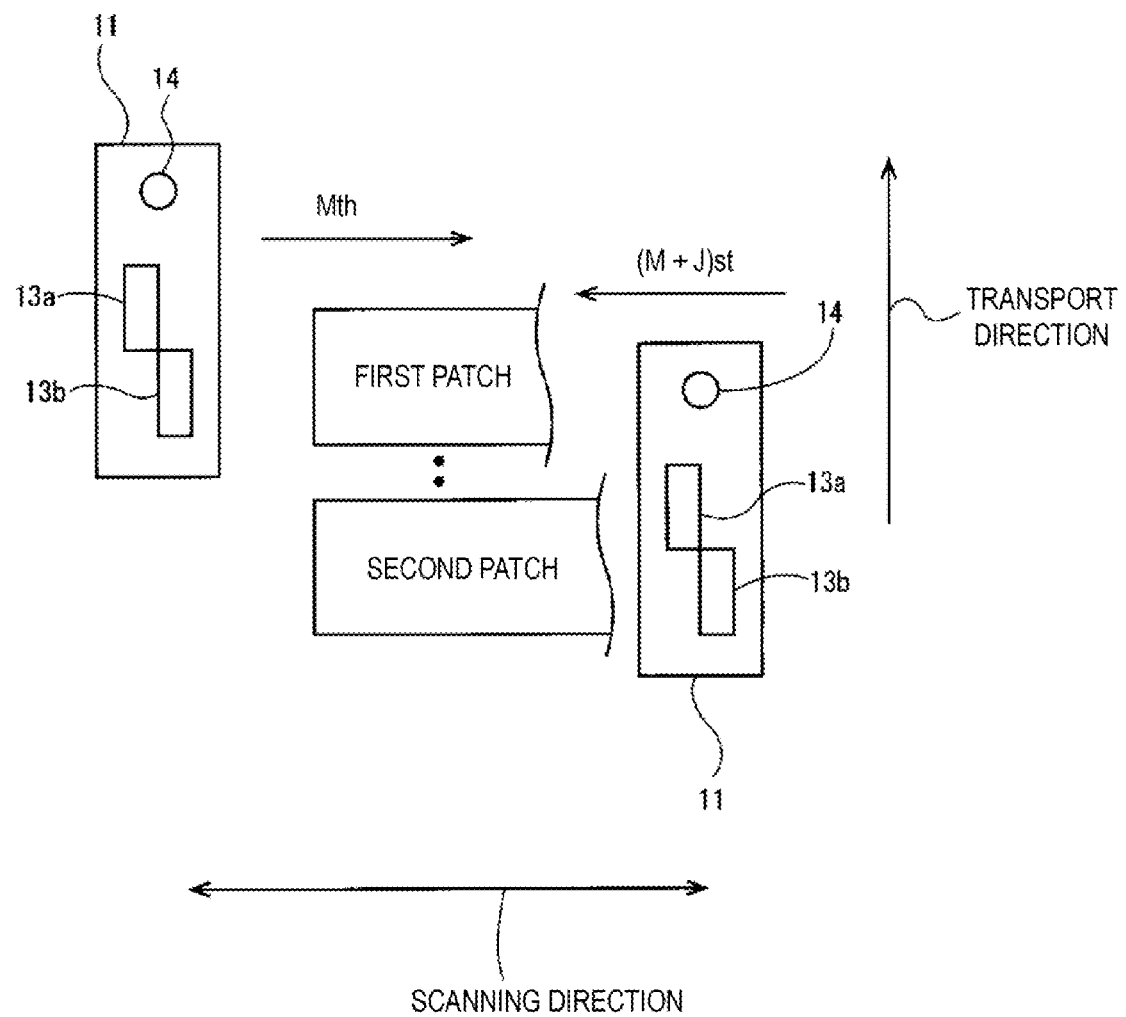
FIG. 14 is a diagram illustrating a process in which printing and colorimetry are performed in parallel.

FIG. 14 is a diagram illustrating a process of performing printing and colorimetry in parallel. The control unit 30, by controlling the scanning unit 10 and the transport unit 20, reciprocates the carriage 11 in the scanning direction with the carriage 11 facing the medium, and moves the medium in the transport direction. Here, given M as an integer of 1 or greater, the control unit 30 causes the heads 13a, 13b to print the first patch during the Mth movement of the carriage 11 in the scanning direction. Thereafter, with paper feeding, opportunities arise for the patch printed by the Mth movement of the carriage 11 in the scanning direction to face the color measuring element 14 in subsequent movements of the carriage 11 in the scanning direction. The color measuring element 14 facing the same patch is not limited to the Mth+1 time, and such a state may occur during movement of the carriage 11 in the scanning direction several times after the Mth time. That is, given J as an integer of 1 or greater, during the (M+J)-th movement of the carriage 11 in the scanning direction, the color measuring element 14 can perform colorimetry on the first patch. Further, in parallel with this, during the (M+J)th movement of the carriage in the scanning direction, the second patch can be printed by the heads 13a, 13b.

In this manner, the control unit 30, while moving the carriage 11, that is, the heads 13a, 13b, and the color measuring element 14 in the scanning direction, causes the heads 13a, 13b to form the first patch and the transport unit 20 to transport the medium to a position where the first patch faces the color measuring element 14. Then, the control unit 30, while moving the carriage 11, that is, the heads 13a, 13b, and the color measuring element 14 in the scanning direction, causes the heads 13a, 13b to form the second patch and the color measuring element 14 to perform colorimetry on the first patch.

As described above, one patch can be read by a plurality of scanning operations, making it possible to suppress a lengthening of each patch in the scanning direction. Thus, the colorimetric accuracy can be improved without increasing the patch area.

The present disclosure described above is summarized as follows.

A printing apparatus according to the present disclosure includes a printing unit configured to move in a scanning direction and perform printing on a medium, a color measuring unit configured to move in the scanning direction with the printing unit, and configured to perform colorimetry on patches by reading a wavelength of reflected light from the patches printed on the medium, and a control unit configured to execute a scanning operation of moving the color measuring unit in the scanning direction to pass the color measuring unit over the patches and thus cause the color measuring unit to read a wavelength of reflected light of the patch. At this time, the color measuring unit is configured to read light corresponding to a wavelength region selected from within a wavelength region of light divided into a plurality of wavelength regions. Further, the control unit is configured to cause the color measuring unit to read, in one scanning operation, light corresponding to a portion of the plurality of wavelength regions of light to be read, perform a plurality of the scanning operations while changing a wavelength region of the plurality of wavelength regions of light to be read by the color measuring unit, and thus complete colorimetry of the patches.

This makes it possible to read one patch by a plurality of scanning operations, and thus suppress a lengthening of each patch in the scanning direction. As a result, the colorimetric accuracy can be improved without increasing the patch area.

Further, in the printing apparatus according the present disclosure, the control unit may be configured to execute a multi-wavelength region mode for causing the color measuring unit to read light corresponding to a plurality of wavelength regions among the plurality of wavelength regions in one scanning operation.

This makes it possible to reduce the number of scanning operations required to read one patch.

Further, in the printing apparatus according the present disclosure, the control unit may be configured to execute a single wavelength region mode for causing the color measuring unit to read light corresponding to one wavelength region among the plurality of wavelength regions in one scanning operation.

This makes it possible to reduce the time required for one scanning operation.

Further, the printing apparatus according the present disclosure may further include a transport unit configured to move one of the medium and the printing unit relative to the other in a transport direction intersecting with the scanning direction, and the control unit may be configured to cause the printing unit to print, as the patches, a single wavelength region patch in the single wavelength region mode. At this time, the single wavelength region patch may have a length in the transport direction greater than a length in the scanning direction.

This makes it possible to suitably perform colorimetry on the patches even in the single wavelength region mode in which the number of scanning operations of the patches tends to increase.

Further, the printing apparatus according the present disclosure may further include a transport unit configured to move one of the medium and the printing unit relative to the other in a transport direction intersecting with the scanning direction, and the color measuring unit may be disposed in a position shifted in the transport direction relative to the printing unit, causing a predetermined region of the medium to face the printing unit and subsequently face the color measuring unit. At this time, the control unit may be configured to cause the printing unit to form a first patch while moving the printing unit and the color measuring unit in the scanning direction, cause the transport unit to transport the medium to a position where the first patch faces the color measuring unit, and cause the printing unit to form a second patch and the color measuring unit to measure the color of the first patch while moving the printing unit and the color measuring unit in the scanning direction.

As a result, patch printing and patch colorimetry can be executed in parallel and, compared to when patch colorimetry is started after all patches have been printed, the time required to complete patch colorimetry can be reduced.

Further, the printing apparatus according to the present disclosure may further include a transport unit configured to move one of the medium and the printing unit relative to the other in a transport direction intersecting with the scanning direction. When, after the control unit causes the transport unit to move the medium or the printing unit in the transport direction and the patches subject to colorimetry have all passed a position facing the color measuring unit, there is a wavelength region among the plurality of wavelength regions of light not read in the patches, the control unit may be configured to cause the transport unit to move one of the medium and the printing unit in a direction opposite to the transport direction, and the color measuring unit to read the wavelength region among the plurality of wavelength regions of light not read in the patches.

Thus, when colorimetry of the patches cannot be completed by colorimetry performed in parallel with patch printing, colorimetry alone may be performed, making it possible to suitably complete colorimetry of the patches.

Further, a colorimetry control method of a printing apparatus according to the present disclosure is a colorimetry control method for a printing apparatus including a printing unit configured to move in a scanning direction and perform printing on a medium, and a color measuring unit configured to move in the scanning direction with the printing unit, and configured to perform colorimetry on patches by reading a wavelength of reflected light from the patches printed on the medium. The color measuring unit is configured to read light corresponding to a wavelength region selected from within a wavelength region of light divided into a plurality of wavelength regions. The colorimetry control method includes the step of, when a scanning operation of moving the color measuring unit in the scanning direction to pass the color measuring unit over the patches and thus cause the color measuring unit to read a wavelength of reflected light of the patches is configured to be executed, causing the color measuring unit to read, in one scanning operation, light corresponding to a portion of the plurality of wavelength regions of light to be read, perform a plurality of the scanning operations while changing a wavelength region of the plurality of wavelength regions of light to be read by the color measuring unit, and thus complete colorimetry of the patches.

This makes it possible to read one patch by a plurality of scanning operations, and thus suppress a lengthening of each patch in the scanning direction. As a result, the colorimetric accuracy can be improved without increasing the patch area.

Note that the present disclosure of course is not limited to the exemplary embodiments described above. For example, also disclosed as exemplary embodiments of the present disclosure are:

The modification and application of appropriate combinations of mutually substitutable members, configurations, and the like disclosed in the exemplary embodiments described above The modification and application of appropriate substitutions and combinations of mutually substitutable members, configurations and the like which, though not disclosed in the exemplary embodiments described above, employ widely-known technology The modification and application of appropriate substitutions and combinations of members, configurations and the like which, though not disclosed in the exemplary embodiments described above, can be assumed as substitutes by one having ordinary skill in the art on the basis of widely-known technology and the like.

are disclosed as exemplary embodiments of the present disclosure.

What is claimed is:

1. A printing apparatus comprising:
   a printing unit configured to move in a scanning direction and perform printing on a medium;
   a color measuring unit configured to move in the scanning direction with the printing unit, and configured to perform colorimetry on patches by reading a wavelength of reflected light from the patches printed on the medium; and
   a control unit configured to execute a scanning operation of causing the color measuring unit to read a wavelength of reflected light from the patches by moving the color measuring unit in the scanning direction to pass over the patches, wherein
   the color measuring unit is configured to read light corresponding to a wavelength region selected from within a wavelength region of light divided into a plurality of wavelength regions, and
   the control unit is configured to cause the color measuring unit to read, in one scanning operation, light corresponding to a portion of the wavelength regions of light to be read, perform a plurality of the scanning operations while changing a wavelength region of light to be read by the color measuring unit, and thus complete colorimetry of the patches.

2. The printing apparatus according to claim 1, wherein the control unit is configured to execute a multi-wavelength region mode for causing the color measuring unit to read light corresponding to a plurality of wavelength regions in one scanning operation.

3. The printing apparatus according to claim 1, wherein the control unit is configured to execute a single wavelength region mode for causing the color measuring unit to read light corresponding to one wavelength region in one scanning operation.

4. The printing apparatus according to claim 3, comprising:
   a transport unit configured to move one of the medium and the printing unit relative to the other in a transport direction intersecting with the scanning direction, wherein
   the control unit is configured to cause the printing unit to print, as the patches, a single wavelength region patch in the single wavelength region mode and
   the single wavelength region patch has a length in the transport direction greater than a length in the scanning direction.

5. The printing apparatus according to claim 1, comprising:
   a transport unit configured to move one of the medium and the printing unit relative to the other in a transport direction intersecting with the scanning direction, wherein
   the color measuring unit is disposed in a position shifted in the transport direction relative to the printing unit, causing a predetermined region of the medium to face the printing unit and subsequently face the color measuring unit, and
   the control unit is configured to
   cause the printing unit to form a first patch while moving the printing unit and the color measuring unit in the scanning direction,
   cause the transport unit to transport the medium to a position where the first patch faces the color measuring unit, and
   cause the printing unit to form a second patch and the color measuring unit to perform colorimetry on the first patch while moving the printing unit and the color measuring unit in the scanning direction.

6. The printing apparatus according to claim 1, comprising:
   a transport unit configured to move one of the medium and the printing unit relative to the other in a transport direction intersecting with the scanning direction, wherein
   when, after the control unit causes the transport unit to move the medium or the printing unit in the transport direction and the patches subject to colorimetry all pass a position facing the color measuring unit, there is a wavelength region of light not read from the patches,
   the control unit is configured to cause the transport unit to move one of the medium and the printing unit in a direction opposite to the transport direction, and the color measuring unit to read the wavelength region of light not read from the patches.

7. A colorimetry control method of a printing apparatus including
   a printing unit configured to move in a scanning direction and perform printing on a medium and
   a color measuring unit configured to move in the scanning direction with the printing unit, and configured to perform colorimetry on patches by reading a wavelength of reflected light from the patches printed on the medium, wherein
   the color measuring unit is configured to read light corresponding to a wavelength region selected from within a wavelength region of light divided into a plurality of wavelength regions, the colorimetry control method comprising when a scanning operation of causing the color measuring unit to read a wavelength of reflected light from the patch by moving the color measuring unit in the scanning direction to pass over the patch is executable, causing the color measuring unit to read, in one scanning operation, light corresponding to a portion of wavelength regions of light to be read, perform a plurality of the scanning operations while changing a wavelength region of light to be read by the color measuring unit, and thus complete colorimetry of the patches.

\* \* \* \* \*